UNITED STATES PATENT OFFICE.

ANTON GEORG ANDERSON, OF HOBOKEN, NEW JERSEY.

IMPROVEMENT IN COMPOSITION PAVEMENTS.

Specification forming part of Letters Patent No. 115,924, dated June 13, 1871.

*To all whom it may concern:*

Be it known that I, ANTON GEORG ANDERSON, of Hoboken, in the county of Hudson and in the State of New Jersey, have invented a new and useful Improvement in Pavements; and I do hereby declare the following to be a full, clear, and exact description of the same.

The nature of my invention consists in the combination of hot dry sand, gravel, and broken stone, chemically-prepared tar, asphaltum or pitch, Egyptian cement, slaked lime, pulverized slate, pyrites, chalk, water-glass, and dead oil. The object of this invention is to produce an insoluble, hard, and cohesive composition which is impervious to water and inabsorptive of moisture, unaffected by changes of temperature, and which will present a smooth surface without being slippery, and a durable surface to the wear of horseshoes and vehicles.

Crude tar, or such which is generally used for concrete or asphaltum pavements, is known to contain water and a variety of more or less volatile oils, (picolin, lutidin, collidin, &c.,) some of which (picolin in particular) are soluble in water. They are all soluble, even in weak acids, with which they form new combinations, and they oxidize in the air, acting destructively to all substances, organic or metallic, with which they, in any form, come in contact. When in pavements they are injurious because they destroy the cohesiveness of the material, and the soluble oils are dissolved by rain and washed away, subsequent heat or dryness causing the thereby incohesive remaining mass to crumble, and the wind carrying it off in the shape of dust, or a rain washing it away. The water always present in crude tar contains, in solution, picolin and ammonia, partly free and partly in combination with a number of other moistures, strongly absorbing substances, such as carbonic and acetic acids, sulpho-hydrogen, hydrocyanic acid, &c., which, like all ammoniacal salts, in never-ceasing absorption of moisture, will, in a comparatively short time, entirely destroy the cohesiveness and durability of a concrete or asphaltum pavement. The first requisite then of tar to be used for paving purposes is that it shall be as much as possible free from water, oils, and ammoniacal salts, held in solution therein. Such water-free tar is what I herein call chemically-prepared tar, which is kept boiling four or five hours before it is used. Pine-tar ought never to be employed for such purpose. Besides the indurability of such pavements in which it has been employed, the pine-tar, being full of organic substances, decomposes (decays) and produces, as a result, a number of offensive gases, together with innumerable microscopic infusorial insects, which must be inhaled with the air, mixed with the dust and gases, from such streets in which the pavement is laid, to the evident detriment of health. I am also aware that lime from gas-factories has been used to some extent for concrete and asphaltum pavements, to which it is, however, but ill adapted, as it contains sulphuric acid, ammonia, and other moisture-absorbing impurities from the gas. A pavement laid with such lime will soon crumble and wash away.

Having made this explanatory preamble, I will proceed to describe the *modus operandi* of my invention: The road or street to be paved is first graded and then rolled with a heavy stone or steam-roller until it becomes very hard and solid. A foundation is first laid, consisting of stone, gravel, chemically-prepared tar, and Egyptian cement, to a thickness of two or more inches. This layer is then, as before, compressed by a heavy granite or steam-roller to form a solid bed for the foundation. On this base is then applied a second layer, consisting of the following composition: Thirty-two parts of hot sand, gravel, or broken stone; three and a half parts of chemically-prepared tar; three parts of asphaltum or pitch; two parts of Egyptian cement; one part of slaked lime; one part of pulverized slate; one part of pulverized pyrites; one part of dead oil; one part of pulverized chalk; and one part of water-glass. The chemically-prepared tar and the pitch or asphaltum are heated in separate vessels, and not mixed together before they have obtained the required heat, and are then mixed with the other ingredients of which the composition consists. The above-named ingredients may be varied somewhat, and some of them may be dispensed with, as the season, climate, state of soil, or location may require. The ingredients are mixed by hand or machinery and applied hot. The second layer is then compressed by rollers, as before mentioned, and covered with fine sand or cement, in the usual manner. When the pavement is not much exposed to wear, &c., one layer may be sufficient. In paving on top of cobble-stone pavement the street should be swept clean and sprinkled with tar to form a cement for the base before applying the first layer, which, in this case, need not be so thick as where no pavement previously existed. The pavement may, on account of its hardness, smoothness, imperviousness, and durability, be equally applicable for streets, roads, promenading places, side-walks, parks, floors in stables, warehouses, &c.; and in damp cellars it is an excellent prevention against diseases arising from moisture and malaria.

Having thus described my invention, what I claim, and desire to secure by Letters Patent, is—

The composition herein described, substantially as and for the purpose set forth.

In testimony whereof I have signed my name to this specification in the presence of two subscribing witnesses.

A. G. ANDERSON.

Witnesses:
DAVID E. CRONIN,
EDWD. HARTNAGLE.